United States Patent
Chang et al.

(10) Patent No.: US 9,852,045 B2
(45) Date of Patent: Dec. 26, 2017

(54) DEBUGGING PROGRAM CODE

(71) Applicant: International Business Machines Corporation, Armonk, NY (US)

(72) Inventors: Peng Chang, Beijing (CN); Chun Ling Li, Beijing (CN); ZhiGang Lin, Beijing (CN); Nan Shi, Beijing (CN); Xiao Feng Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 14/881,461

(22) Filed: Oct. 13, 2015

(65) Prior Publication Data

US 2017/0103010 A1 Apr. 13, 2017

(51) Int. Cl.
*G06F 11/36* (2006.01)

(52) U.S. Cl.
CPC .................. *G06F 11/362* (2013.01)

(58) Field of Classification Search
CPC .............. G06F 7/78; G06F 8/00–8/78; G06F 9/44–9/455; G06F 11/36
See application file for complete search history.

(56) References Cited

U.S. PATENT DOCUMENTS

| 7,174,536 B1 * | 2/2007 | Kothari | G06F 11/3664 |
| | | | 717/105 |
| 7,530,056 B1 * | 5/2009 | Yaari | G06F 11/3604 |
| | | | 717/128 |
| 8,122,292 B2 | 2/2012 | Nanjundaswamy | |
| 8,429,622 B2 | 4/2013 | Nanjundaswamy | |
| 8,881,106 B2 | 11/2014 | Lachner et al. | |
| 2004/0153802 A1 * | 8/2004 | Kudo | G06F 11/273 |
| | | | 714/30 |
| 2009/0138853 A1 * | 5/2009 | Orrick | G06F 11/362 |
| | | | 717/124 |
| 2011/0283256 A1 * | 11/2011 | Raundahl Gregersen | G06F 8/67 |
| | | | 717/108 |
| 2014/0201718 A1 | 7/2014 | Bates et al. | |

(Continued)

OTHER PUBLICATIONS

Stoerzer et al., Finding Failure-Inducing Changes in Java Programs using Change Classification, 2006.*

(Continued)

*Primary Examiner* — Umut Onat
*Assistant Examiner* — Zhan Chen
(74) *Attorney, Agent, or Firm* — Bryan D. Wells (57) ABSTRACT

Embodiments for debugging program code are provided. In response to a debug comparison request, (i) a first set of debugging operations are initiated on a first portion of program code selected from an original version of a program, and (ii) a second set of debugging operations are initiated on a second portion of program code selected from a revised version of the program. The second portion of program code corresponds to the first portion of program code. Execution of the first and second portions of program code is synchronized. The first and second set of debugging operations are stopped in response to determine that at least one of a first and a second stop condition exists based, at least in part, on a comparison of the results from executing one or more lines of corresponding code from the first and second portions of program code.

18 Claims, 3 Drawing Sheets

(56) References Cited

U.S. PATENT DOCUMENTS

2015/0040108 A1 2/2015 Kushida et al.
2016/0314061 A1* 10/2016 Spengler ............. G06F 11/3668

OTHER PUBLICATIONS

Adler et al., Revision Debug with Non-Linear Version History in Regression Verification, 2016.*
Jones et al., "Debugging in Parallel", ISSTA'07, Jul. 9-12, 2007, London, England, United Kingdom, Copyright 2007, ACM 978-1-59593-734-6/07/0007, pp. 16-26.
O'Connor et al., "Parallel Debugging is Easy", An Allinea Software White Paper, pp. 1-12, provided by inventor on Jun. 23, 2015, <https://www.allinea.com/sites/default/files/uploads/allinea-parallel_debugging_is_easy.pdf>.

* cited by examiner

```
1.      int i = 0;
2.      int j = 0;
3.
4.      i = functionB(input);
5.
6.      if(functionC(i) > 100) {
7.              j = i + functionC(i);
8.      }
9.      else {
10.             j = 1 + functionC(i);
11.     }
```

FIG. 3

```
1.      int i = 0;
2.      int j = 0;
3.
4.      i = functionB'(input);
5.
6.      if(functionC(i) > 100) {
7.              j = i + functionC(i);
8.      }
9.      else {
10.             j = 1 + functionC(i);
11.     }
```

FIG. 4

DEBUGGING PROGRAM CODE

TECHNICAL FIELD

The present disclosure relates to debugging program code, particularly to comparing debug processes.

BACKGROUND

Debugging is the process of finding and resolving software bugs or defects that prevent correct operation of computer software or a system. A software bug is an error, flaw, failure, or fault in a computer program or system that causes it to produce an incorrect or unexpected result, or to behave in unintended ways. Most bugs arise from mistakes and errors made by people in either a program's source code or its design, or in frameworks and operating systems used by such programs, and a few are caused by compilers producing incorrect code. A program that contains a large number of bugs, and/or bugs that seriously interfere with its functionality, is said to be buggy. Reports detailing bugs in a program are commonly known as bug reports, defect reports, fault reports, problem reports, trouble reports, or change requests.

Bugs trigger errors that can in turn have a wide variety of ripple effects, with varying levels of inconvenience to the user of the program. Some bugs have only a subtle effect on the program's functionality, and may thus lie undetected for a long time. More serious bugs may cause the program to crash or freeze. Others qualify as security bugs and might for example enable a malicious user to bypass access controls in order to obtain unauthorized privileges.

SUMMARY

According to one embodiment of the present invention, a method for debugging program code is provided. The method includes: in response to a debug comparison request, initiating, by one or more computer processors, (i) a first set of debugging operations on a first portion of program code that is selected from an original version of a program and (ii) a second set of debugging operations on a second portion of program code that is selected from a revised version of the program, wherein the second portion of program code corresponds to the first portion of program code; synchronizing, by or more computer processors, execution of the first portion of the program code with execution of the second portion of program code; and stopping, by one or more computer processors, the first set of debugging operations and the second set of debugging operations in response to determining, by one or more computer processors, that at least one of a first stop condition and a second stop condition exists based, at least in part, on a comparison of one or more results of executing one or more lines of code from the first portion of program code with one or more results of executing one or more corresponding lines of code from the second portion of program code.

According to another embodiment of the present invention, a computer program product for debugging program codes is provided. The computer program product comprises a computer readable storage medium and program instructions stored on the computer readable storage medium. The program instructions include: program instructions to, in response to a debug comparison request, initiate (i) a first set of debugging operations on a first portion of program code that is selected from an original version of a program and (ii) a second set of debugging operations on a second portion of program code that is selected from a revised version of the program, wherein the second portion of program code corresponds to the first portion of program code; program instructions to synchronize execution of the first portion of the program code with execution of the second portion of program code; and program instructions to stop the first set of debugging operations and the second set of debugging operations in response to a determination that at least one of a first stop condition and a second stop condition exists based, at least in part, on a comparison of one or more results of executing one or more lines of code from the first portion of program code with one or more results of executing one or more corresponding lines of code from the second portion of program code.

According to another embodiment of the present invention, a computer system for debugging program code is provided. The computer system includes one or more computer processors, one or more computer readable storage media, and program instructions stored on the computer readable storage media for execution by at least one of the one or more processors. The program instructions include: program instructions to, in response to a debug comparison request, initiate (i) a first set of debugging operations on a first portion of program code that is selected from an original version of a program and (ii) a second set of debugging operations on a second portion of program code that is selected from a revised version of the program, wherein the second portion of program code corresponds to the first portion of program code; program instructions to synchronize execution of the first portion of the program code with execution of the second portion of program code; and program instructions to stop the first set of debugging operations and the second set of debugging operations in response to a determination that at least one of a first stop condition and a second stop condition exists based, at least in part, on a comparison of one or more results of executing one or more lines of code from the first portion of program code with one or more results of executing one or more corresponding lines of code from the second portion of program code.

DETAILED DESCRIPTION

Embodiments of the present invention recognize that, when a change is made to computer program code and the change causes a system function error, it can be very difficult to identify the problem. It is particularly difficult to identify the problem when the input/output of a function area in which the change is incorporated is correct but the system function, as a whole, is incorrect.

For example, in a code stream of a program, there is a function "service add( )" which calls functions "Func addParent( )" and "Func addChild( )", and these functions, "Func addParent( )" and "Func addChild( )" call a sub-function "get( )". It is assumed that there is no problem in the above code stream before the program is revised. After the program is revised (e.g., there is a change set "if exist in cache get from cache" in the sub-function "get( )"), however, the output of the function "service add( )," as a whole, is not correct. In this situation the problem is very difficult to identify and it is hard to spot the change that caused the problem.

Embodiments will be described in more detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
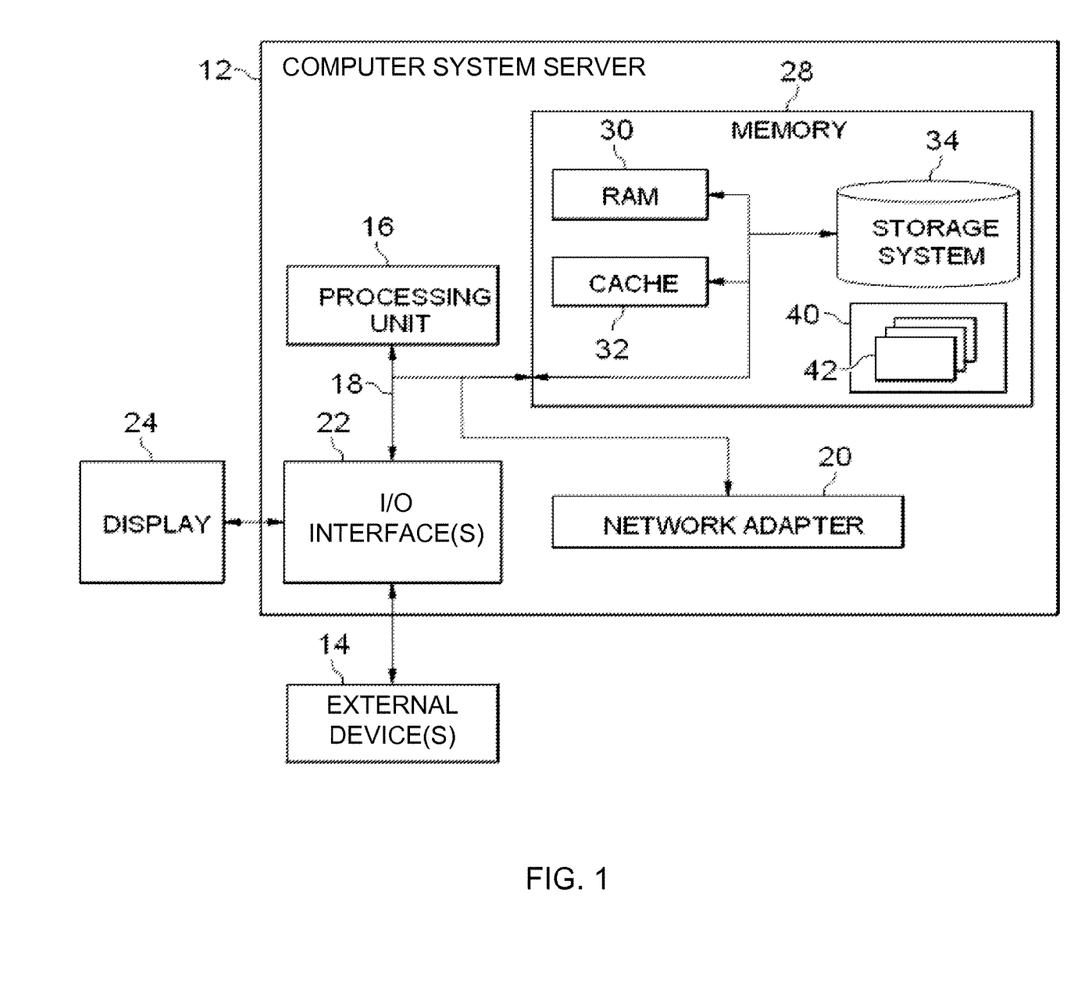
FIG. 1 depicts an example of a computer system for debugging program code, in accordance with an embodiment of the present disclosure.

FIG. 1 depicts an example of a computer system for debugging program code, in accordance with an embodiment of the present disclosure. Specifically, FIG. 1 depicts computer system/server 12. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
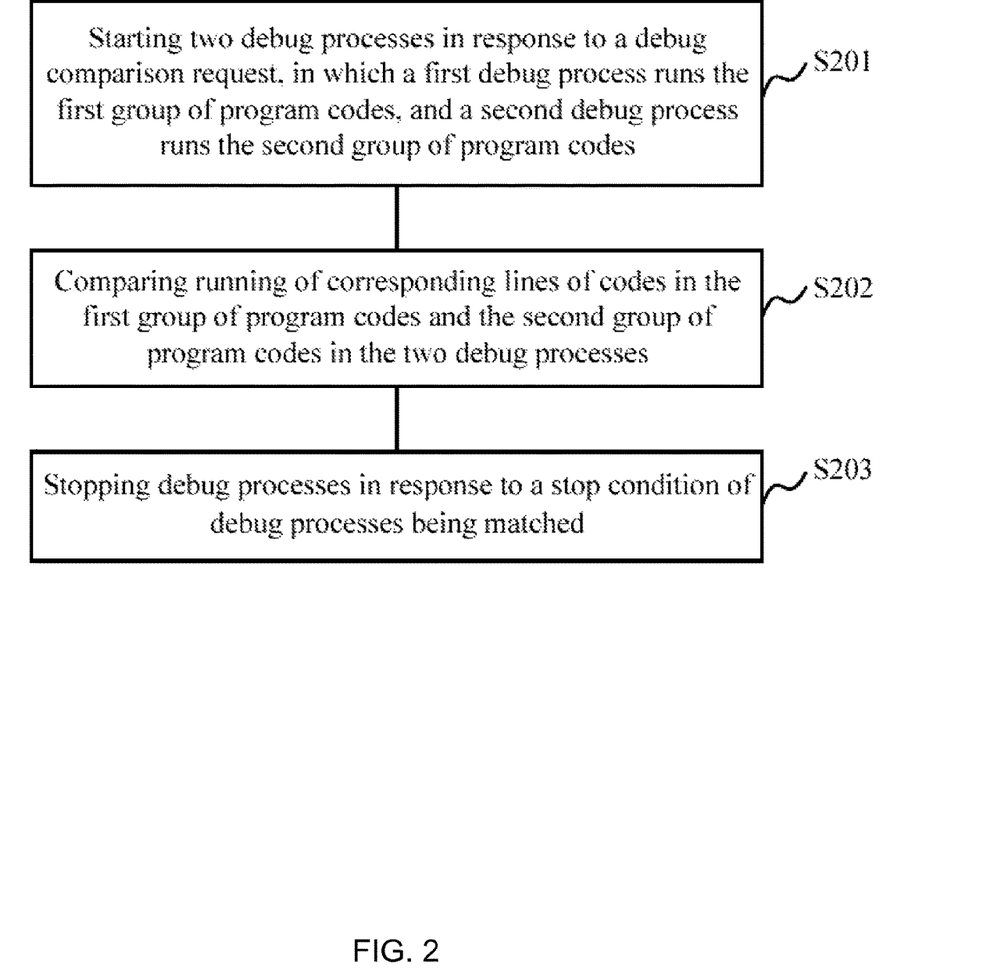
FIG. 2 depicts operations for debugging a program, in accordance with an embodiment of the present disclosure.

FIG. 2 depicts operations for debugging a program according to an embodiment of the present disclosure. Operations for debugging a program according various embodiments of the present disclosure can be implemented by a computer system, such as the computer system depict in FIG. 1. The method could be executed in the integration developing environment (IDE) running in a computer system. In some embodiments, the operations for debugging a program are implemented by comparing the two parallel debug processes in one IDE, synchronizing the execution flow (i.e., the two parallel debug processes are compared synchronously), and comparing the run time variables and execution path. The debug processes are stopped when pre-defined rules are satisfied (e.g., output values are different or code execution paths are different). In this way, the developer can easily identify the problem caused by the change set.

In embodiments that are implemented using an IDE, a developer needs at first to open in the computer system the IDE required by the development of a program. In some embodiments, there is installed a debug comparison plugin (or called debug comparison tool/application) in the IDE, which can call two debug processes to debug two programs respectively. In other embodiments, there is installed a debug comparison feature (such as icon or button) in the debugger of the IDE, once the feature is active, the debugger starts two debug processes to debug two programs respectively. The IDE is not a limitation to the scope of the present disclosure. In yet other embodiments of the present disclosure, the method for debugging a program according to the present disclosure could also be executed in other developing environments.

In various embodiments of the present disclosure, a program to be debugged can include two groups of program code. As used herein, a first portion of program code refers to original code and a second portion of program code refers to new lines of code that are revised from the original lines code. The sequence and number of the first portion and the second portion of program code, as referenced herein, is not a limitation of the present disclosure. When developing a program, the developer commonly makes revisions based, at least in part, on the previous version of the program (here called the original version) and forms a new version of the program (called the revised version herein). The number of the lines of code in the second portion of program code can be large or small in relation to the number of lines of code in a program. In general, however, the first and second portions of program code share a plurality of similar lines of code. In order to perform the program debug and find where the problem occurred in the program, it is necessary to compare the running of corresponding lines of code of the first and second portions of program code in accordance with the method for debugging the program in the present disclosure.

The first and second portions of program code will now be described with respect to the examples depicted in FIG. 3 and FIG. 4, in accordance with an embodiment of the present disclosure.

Figure 3:
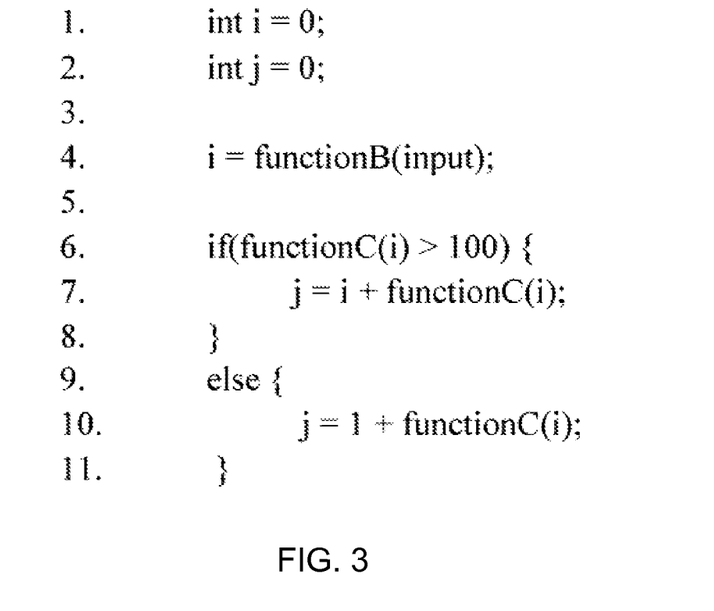
FIG. 3 is an example of a first portion of program code, in accordance with an embodiment of the present disclosure.

FIG. 3 is an example of the first portion of program code, in accordance with an embodiment of the present disclosure. In line 4, the value of "i" is calculated by the function "functionB." In line 6, the value of the function "functionC (i)" is compared with the value of "100," and when it matches the condition that the value of the function "functionC(i)" is larger than the value of "100," the code in line 7 is executed, otherwise the code in line 10 is executed.

Figure 4:
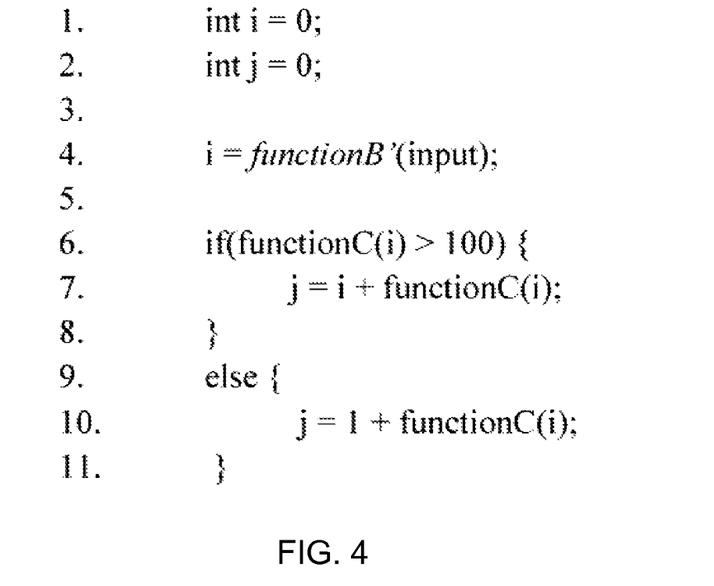
FIG. 4 is an example of a second portion of program code, in accordance with an embodiment of the present disclosure.

FIG. 4 is an example of the second portion of program code, in accordance with an embodiment of the present disclosure. In line 4, the value of "i" is calculated by the function "functionB'." In line 6, the value of the function "functionC(i)" is compared with the value of "100," and when it matches the condition that the value of the function "functionC(i)" is larger than the value of "100," the code in line 7 is executed, otherwise the code in line 10 is executed.

In the above examples, it is supposed that the function "functionB" in FIG. 3 contains the original code, while the function "functionB'" in FIG. 4 contains the revised new code.

As shown in FIG. 2, two debug processes are started in step S201, in which a first debug process executes the first portion of program code, and a second debug process executes the second portion of program code. In various embodiments of the present disclosure, the abovementioned two debug processes may be called by a debug comparison plugin/tool/application pre-installed in the IDE or may be executed by activating a debug comparison feature (e.g., an icon or a button) in a GUI (Graphical User Interface) of the debugger of the IDE, so as to debug the two portions of program code respectively. The operation of initiating the two debug processes can be manually performed by the developer or automatically performed by a computer system. The way in which the two debug processes are initiated is not a limitation of the present disclosure.

In accordance with an embodiment of the present disclosure, two windows can be displayed on the display unit (e.g., a display screen) of the computer system with each of the two debug processes being displayed in a respective window. The windows can be displayed concurrently or separately. Concurrently displayed windows can be displayed with any of various orientations relative to one another. For example, the windows can be concurrently displayed to the left and right of a vertical axis or, in another example, to the top and bottom of a horizontal axis. The mode in which the two debug processes are displayed is not a limitation of the present disclosure, and those skilled in the art will understand that the two debug processes can be displayed in various ways, so long as the comparison result is reviewable.

In step S202, the execution of corresponding lines of code in the first portion of program code and the second portion of program code are synchronized and compared in the two debug comparison processes, as shown in FIG. 2. According to one embodiment of the present disclosure, the lines of code in the first portion of program code and the second portion of program code respectively refer to one or more original lines of code and one or more lines of revised code that correspond to the one or more original lines of code. For example, the results of executing line 1 in FIG. 3 are synchronously compared with the results of executing line 1 in FIG. 4, the results of executing line 2 in FIG. 3 are synchronously compared with the results of executing line 2 in FIG. 4, and the results of executing line 4, "i=functionB (input)," in FIG. 3 are synchronously compared with the results of executing line 4, "i=functionB'(input)," in FIG. 4. The execution of first portion and second portion of program code is synchronized and the comparisons are performed synchronously in that each set of corresponding lines of code are executed and the results compared before a successive set of corresponding lines code are executed and the results compared. According to one embodiment of the present disclosure, line 4 "i=functionB'(input)" in FIG. 4 involves at least one line of revised code.

In some situations, the program to be debugged is quite long (e.g., the program includes tens of thousands of lines of code) but there may not be many lines of revised code. In such a condition, it is unnecessary to compare the whole program code, and only the part of code related to the revision needs to be compared, thus it is necessary to reduce the comparison scope. Under such a circumstance, in accordance with the above embodiments of the present disclosure, a scope of comparison is received with which to compare the two portions of program code. According to various embodiments of the present disclosure, the scope of comparison can be manually set by a program developer before debugging the program, or it can be automatically set by the debugger of the IDE before or in debugging the program. When the scope of comparison is manually set by the developer, the debugger can receive the set scope before or while in the process of debugging the program. For example, the program code from line XXX to line YYY in the above program code are set as the scope of comparison. In FIG. 3 and FIG. 4, for example, the program code from line 1 to line 6 in the above program code may be set as the scope of comparison. The way in which the scope of comparison is set is not a limitation of the scope of the present disclosure. For example, all of the program code can be regarded as the debug object and a less inclusive scope of comparison need not be set.

In step S203, the debug processes are stopped in response to a stop condition of the debug processes being matched, as shown in FIG. 2. The stop condition can be predefined as that the output variable values of the compared two code lines are different, or can be defined as that the execution paths of the compared two lines of code are different.

For instance, in line 4 of FIG. 3, the function "functionB" contains the original program code which is not revised. It is supposed that the output value "i" of the function "functionB" is "10." In line 4 of FIG. 4, the function "functionB'" contains revised program code, it is supposed to cause the output value "i" of the function "functionB'" to be "20." Accordingly, the comparing result of line 4 in FIG. 3 and line 4 in FIG. 4 is that the output variable values of the two code lines are different. In this condition, it proves that the newly revised program code in the function of "functionB'" affect the above whole program. In this circumstance, it could highlight, in the windows in which the two lines of compared program code are displayed, the code line or the variable value which matches the above stop condition. For example, line 4 or the variable value "i" is highlighted for the developer's reference to diagnose the problem occurred in the program.

Referring again to an example with respect to FIG. 3 and FIG. 4, in line 4 of FIG. 3, the function "functionB" contains the original program code which is not revised. It is supposed that the output value "i" of the function "functionB" is "10." In line 4 of FIG. 4, the function "functionB'" contains revised program code, it is supposed that the revised program code causes the output value "i" of the function "functionB'" to be "20." Because of difference of the values of "i" in the two portions of program code, it is supposed that the condition "if(functionC(i)>100)" in line 6 of FIG. 3 is not matched, the process jumps to line 10, and it is supposed that the condition "if(functionC(i)>100)" in line 6 of FIG. 4 is matched, thus the process jumps to line 7. Consequently, the comparing result of line 4 of FIG. 3 and line 4 of FIG. 4 is that the execution paths of the two code lines are different. In this condition, it also proves that the newly revised program code in the function of "functionB'" affect the above whole program. In this circumstance, it could highlight, in the windows in which the two lines of compared program code are displayed, the code line or the variable value which matches the above stop condition. For example, line 6 or the variable value "functionC(i)" is highlighted for the developer's reference to diagnose the problem occurred in the program.

The above stop conditions could be separately set by the program developer before debugging the program, or automatically set by the above comparison application and/or the debugger of the IDE. The particular way in which the stop condition is set is not a limitation of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for debugging program code, the method comprising:
   in response to a debug comparison request, initiating, by one or more computer processors, (i) a first set of debugging operations on a first portion of program code that is selected from an original version of a program and (ii) a second set of debugging operations on a second portion of program code that is selected from a revised version of the program, wherein the second portion of program code corresponds to the first portion of program code;
   synchronously executing, by one or more computer processors, a first line of code from the first portion of program code and a corresponding first line of code from the second portion of program code;
   synchronously comparing, by one or more computer processes, a result of executing the first line of code from the first portion of program code to a result of executing the corresponding first line of code from the second portion of program code;
   in response to determining, by one or more computer processors, that neither a first stop condition nor a second stop condition exist based on the comparison of the result of executing the first line of code from the first portion of program code and the result of executing the corresponding first line of code from the second portion of program code, synchronously executing, by one or more computer processors, a successive second line of code from the first portion of program code and a successive corresponding second line of code from the second portion of program code;
   synchronously comparing, by one or more computer processes, a result of executing the second line of code from the first portion of program code to a result of executing a corresponding second line of code from the second portion of program code; and
   stopping, by one or more computer processors, the first set of debugging operations and the second set of debugging operations in response to determining, by one or more computer processors, that at least one of a first stop condition and a second stop condition exists based, at least in part, on the comparison of the result of executing the second line of code from the first portion of code to the result of executing the corresponding second line of code from the second portion of program code.

2. The method of claim 1, further comprising:
   concurrently displaying, by one or more computer processors, a visual representation of the first set of debugging operations in a first window and a visual representation of the second set of debugging operations in a second window.

3. The method of claim 2, further comprising:
   identifying on a display, by one or more computer processors, at least one line of code from the first portion of program code that, at least in part, caused the first set of debugging operations to stop and at least one line of code from the second portion of program code that, at least in part, caused the second set of debugging operations to stop.

4. The method of claim 3, wherein the first stop condition is a condition where a first output value of a first line of code in the first portion of program code is not equal to a second output value of a corresponding line of code in the second portion of program code.

5. The method of claim 4, wherein the second stop condition is a condition where an execution path of the first portion of program code includes at least one line of code that is not included in a corresponding execution path of the second portion of program code.

6. The method of claim 5, wherein the first portion of program code includes each line of code in the original version of the program and the second portion of program code includes each line of code in the revised version of the program code.

7. A computer program product for debugging program code, the computer program product comprising:
   a computer readable storage medium and program instructions stored on the computer readable storage medium, the program instructions comprising:
   program instructions to, in response to a debug comparison request, initiate (i) a first set of debugging operations on a first portion of program code that is selected from an original version of a program and (ii) a second set of debugging operations on a second portion of program code that is selected from a revised version of the program, wherein the second portion of program code corresponds to the first portion of program code;

program instructions to synchronously execute a first line of code from the first portion of program code and a corresponding first line of code from the second portion of program code;

program instructions to synchronously compare a result of executing the first line of code from the first portion of program code to a result of executing the corresponding first line of code from the second portion of program code;

program instructions to synchronously execute a successive second line of code from the first portion of program code and a successive corresponding second line of code from the second portion of program code in response to determining that neither a first stop condition nor a second stop condition exist based on the comparison of the result of executing the first line of code from the first portion of program code and the result of executing the corresponding first line of code from the second portion of program code;

program instructions to synchronously compare a result of executing the second line of code from the first portion of program code to a result of executing a corresponding second line of code from the second portion of program code; and program instructions to stop the first set of debugging operations and the second set of debugging operations in response to a determination that at least one of a first stop condition and a second stop condition exists based, at least in part, on the comparison of the result of executing the second line of code from the first portion of code to the result of executing the corresponding second line of code from the second portion of program code.

8. The computer program product of claim 7, the program instructions further comprising:

program instructions to concurrently display a visual representation of the first set of debugging operations in a first window and a visual representation of the second set of debugging operations in a second window.

9. The computer program product of claim 8, the program instructions further comprising:

program instructions to identify, on a display, at least one line of code from the first portion of program code that, at least in part, caused the first set of debugging operations to stop and at least one line of code from the second portion of program code that, at least in part, caused the second set of debugging operations to stop.

10. The computer program product of claim 9, wherein the first stop condition is a condition where a first output value of a first line of code in the first portion of program code is not equal to a second output value of a corresponding line of code in the second portion of program code.

11. The computer program product of claim 10, wherein the second stop condition is a condition where an execution path of the first portion of program code includes at least one line of code that is not included in a corresponding execution path of the second portion of program code.

12. The computer program product of claim 11, wherein the first portion of program code includes each line of code in the original version of the program and the second portion of program code includes each line of code in the revised version of the program code.

13. A computer system for debugging program code, the computer system comprising:

one or more computer processors;

one or more computer readable storage media;

program instructions stored on the one or more computer readable storage media for execution by at least one of the one or more processors, the program instructions comprising:

program instructions to, in response to a debug comparison request, initiate (i) a first set of debugging operations on a first portion of program code that is selected from an original version of a program and (ii) a second set of debugging operations on a second portion of program code that is selected from a revised version of the program, wherein the second portion of program code corresponds to the first portion of program code;

program instructions to synchronously execute a first line of code from the first portion of program code and a corresponding first line of code from the second portion of program code;

program instructions to synchronously compare a result of executing the first line of code from the first portion of program code to a result of executing the corresponding first line of code from the second portion of program code;

program instructions to synchronously execute a successive second line of code from the first portion of program code and a successive corresponding second line of code from the second portion of program code in response to determining that neither a first stop condition nor a second stop condition exist based on the comparison of the result of executing the first line of code from the first portion of program code and the result of executing the corresponding first line of code from the second portion of program code;

program instructions to synchronously compare a result of executing the second line of code from the first portion of program code to a result of executing a corresponding second line of code from the second portion of program code; and program instructions to stop the first set of debugging operations and the second set of debugging operations in response to a determination that at least one of a first stop condition and a second stop condition exists based, at least in part, on the comparison of the result of executing the second line of code from the first portion of code to the result of executing the corresponding second line of code from the second portion of program code.

14. The computer system of claim 13, the program instructions further comprising:

program instructions to concurrently display a visual representation of the first set of debugging operations in a first window and a visual representation of the second set of debugging operations in a second window.

15. The computer system of claim 14, the program instructions further comprising:

program instructions to identify, on a display, at least one line of code from the first portion of program code that, at least in part, caused the first set of debugging operations to stop and at least one line of code from the second portion of program code that, at least in part, caused the second set of debugging operations to stop.

16. The computer system of claim 15, wherein the first stop condition is a condition where a first output value of a first line of code in the first portion of program code is not equal to a second output value of a corresponding line of code in the second portion of program code.

17. The computer system of claim 16, wherein the second stop condition is a condition where an execution path of the first portion of program code includes at least one line of code that is not included in a corresponding execution path of the second portion of program code.

18. The computer system of claim 17, wherein the first portion of program code includes each line of code in the original version of the program and the second portion of program code includes each line of code in the revised version of the program code.

* * * * *